United States Patent [19]

Fujii et al.

[11] Patent Number: 4,701,505
[45] Date of Patent: Oct. 20, 1987

[54] PROCESS FOR PRODUCTION OF OLEFIN POLYMERS

[75] Inventors: Masaki Fujii; Takao Sakai, both of Yokkaichi; Hideo Sakurai, Kuwana; Yosiharu Yamamoto, Mie, all of Japan

[73] Assignee: Mitsubishi Petrochemical Company Limited, Tokyo, Japan

[21] Appl. No.: 778,797

[22] Filed: Sep. 23, 1985

[30] Foreign Application Priority Data

Sep. 26, 1984 [JP] Japan ................................ 59-201348
Dec. 18, 1984 [JP] Japan ................................ 59-267265

[51] Int. Cl.$^4$ .......................... C08F 4/64; C08F 10/06
[52] U.S. Cl. .................................... 526/125; 502/126; 526/119; 526/142; 526/351
[58] Field of Search .......................................... 526/125

[56] References Cited

U.S. PATENT DOCUMENTS

| | | |
|---|---|---|
| 4,124,530 | 11/1978 | Arzoumanidis ..................... 526/142 |
| 4,220,745 | 9/1980 | Tanaka et al. ...................... 526/142 |
| 4,223,117 | 9/1980 | Sano et al. .......................... 526/125 |
| 4,226,741 | 10/1980 | Luciani et al. ...................... 526/125 |
| 4,226,963 | 10/1980 | Giannini et al. .................... 526/125 |
| 4,256,866 | 7/1981 | Karayannis et al. . |
| 4,402,863 | 9/1983 | Miyazaki et al. ..................... 26/125 |
| 4,525,558 | 6/1985 | Takitani et al. ..................... 526/142 |

FOREIGN PATENT DOCUMENTS 564772 8/1958 Belgium .
2040967 9/1980 United Kingdom ................ 526/125

Primary Examiner—Edward J. Smith
Attorney, Agent, or Firm—Oblon, Fisher, Spivak, McClelland, & Maier

[57] ABSTRACT

An olefin is polymerized by using a catalyst consisting essentially of (A) a solid catalyst component containing a magnesium halide and a titanium chloride, (B) an organic aluminum compound, and (C) an ether compound represented by the formula: $R^1R^2R^3C(OR^4)$, $R^1R^2C(OR^4)_2$ or $R^1C(OR^4)_3$. The catalyst has high catalytic activity and high stereoregularity as well as good activity endurance and is especially suitable for production of block copolymers.

2 Claims, No Drawings

PROCESS FOR PRODUCTION OF OLEFIN POLYMERS

BACKGROUND OF THE INVENTION

1. Field of the Invention

This invention relates generally to processes for producing olefin polymers. More specifically, this invention relates to a process for producing olefin polymers characterized by the use of a ctalyst which can provide highly stereoregular polymers in a high yield in the polymerization of α-olefins having not less than 3 carbon atoms.

2. Description of the Prior Art

Hitherto, it has been said that a catalyst system consisting of (i) a solid catalyst component having a titanium compound carried on a magnesium halide and (ii) an organoaluminum compound has a higher polymerization activity than conventional catalyst systems having no titanium compound carried thereon and may not need removal of catalyst residue from the resulting polymer. However, because the use of this carried catalyst causes low stereoregularity, it has been considered that the resulting polymer must be subjected to extraction procedure of so-called atactic polymers Recently, the stereoregularity owing to this carried catalyst has been considerably improved by the use of new co-catalyst systems. More specifically, it is known that a certain degree of highly active and highly stereoregular polymerization can be obtained by using, as polymerization additives, esters (U.S. Pat. No.4,226,741, Japanese Patent Laid-Open Publication No.157808/83, etc.) or phenyl- or alkyl-containing silicon compounds (European Patent Gazette E.P. No. 45975, E.P. No. 45976, E.P. No. 45977, etc.). Even by the use of these polymerization additives, however, it has been difficult to eliminate removal of catalyst residue and extraction process. Thus, further improvement has been desired in this respect.

SUMMARY OF THE INVENTION

We have conducted intensive research on such highly active additives for highly stereoregular polymerization as can make possible a polymerization process without the need for removal of catalyst residue and extraction of undesired polymers. As a result, highly active and highly stereoregular polymerization has been unexpectedly realized by using an ether compound having a specified structure. The present invention is based on this result.

Thus, the process for producing olefin polymers according to the present invention comprises contacting an olefin with a catalyst thereby to polymerize the olefin, the catalyst comprising the following components (A), (B) and (C):

(A) a solid catalyst component comprising as essential components a magnesium halide and a titanium halide, (B) an organic aluminum compound, and (C) an ether compound represented by the formula $R^1R^2R^3C(OR^4)$, $R^1R^2C(OR^4)_2$ or $R^1C(OR^4)_3$, wherein: $R^1$ stands for an aromatic or alicyclic hydrocarbon group, and $R^2$, $R^3$ and $R^4$ stand for hydrocarbon groups which may be the same or may be different.

According to the present invention, there is provided a catalyst which provides high stereoregularity in addition to high activity inherent in a carried catalyst, whereby the polymerization process can be carried out without the need for removal of catalyst residue and extraction to achieve the above set forth objects.

These effects are brought about by using a specific ether compound as an additive. It can be said such effects exhibited by the specific ether compound have been beyond expecation and anticipation by those skilled in the art.

DETAILED DESCRIPTION OF THE INVENTION

Catalyst

The catalyst to be used in the present invention comprises the following components (A), (B) and (C).

Component (A)

The solid catalyst component (A) to be used in the invention contains as essential components a magnesium halide and a titanium halide.

As the magnesium halide, magnesium chloride, magnesium bromide and magnesium iodide, preferably magnesium chloride, and more preferably substantially anhydrous magnesium chloride can be used.

As the titanium halide, chlorides, bromides and iodides of titanium, preferably chlorides thereof such as titanium tetrachloride, titanium trichloride, etc., and more preferably titanium tetrachloride can be used. It is possible to provide a titanium halide by subjecting an alkoxyl-containing titanium compound of the general formula: $Ti(OR)_nCl_{4-n}$ (wherein R denotes an alkyl and n is an integer of 1 to 4) to halogenation treatment in a later step.

In the preparation of the solid catalyst component of the present invention, various electron donors can be used, and the use thereof is preferred.

The electron donors include oxygen-containing compounds and nitrogen-containing compounds.

Oxygen-containing compounds suitable for use are ethers, ketones, acid halides and esters, preferably esters and acid halides.

As the esters, mainly carboxylic acid esters can be used. Aliphatic carboxylic acid esters are exemplified by relatively lower alkyl or alkoxyalkyl esters of relatively lower mono- or di-carboxylic acids such as ethyl acetate, methyl cellosolve acetate, ethyl cellosolve acetate, methyl methacrylate, diethyl oxalate, and dibutyl maleate. Aromatic carboxylic acid esters are exemplified by ethyl benzoate, methyl p-toluylate, diethyl phthalate, and diheptyl phthalate. Of these esters, particularly preferred are phthalates such as diethyl phthalate, and diheptyl phthalate.

As the acid halide, phthaloyl chloride is preferred.

Examples of nitrogen-containing compounds which can be used are amines, nitriles and nitro compounds, of which nitro compounds are preferable.

Suitable nitro compounds are, for example, aromatic or aliphatic mono- and di-nitro compounds.

Examples of suitable nitro compounds are aromatic compounds such as nitrobenzene, o-nitrotoluene, o-dinitrobenzene, m-dinitrobenzene, 2,3-dinitrotoluene, o-nitrobenzonitrile, o-nitroacetophenone, and 1,8-dinitronaphthalene, and aliphatic compounds such as 2-nitro-n-butane, 1,2-dinitrocyclohexane, and 1-nitro2-cyanocyclohexane.

Among the above nitro compounds, the aromatic compounds are preferred. Dinitro compounds or nitro compounds having both a nitro group and another functional group are preferable to the mononitro compounds.

In the preparation of the solid catalyst component, it is desirable to subject magnesium chloride to pretreatment. Such treatment can be carried out by either pulverization or dissolution and precipitation. Pulverization of magnesium chloride can be conducted by using a ball mill or a vibration mill. Dissolution of the magnesium chloride can be conducted by using as a solvent a hydrocarbon or a halogenated hydrocarbon and as a dissolution accelerator an alcohol, a phosphate ester or a titanium alkoxide. Precipitation of the once-dissolved magnesium chloride can be conducted by adding thereto a poor solvent, an inorganic halide, methylhydrogenpolysiloxane, or an electron donor such as an ester. Details of such pre-treatment of magnesium chloride can be found in Japanese Patent Laid-Open Specifications Nos.45688/78, 31092/79, 180612/82, 5309/83 and 5310/83.

Sequence of the contact of the pre-treated magnesium chloride, a titanium halide and an electron donor is arbitrarily chosen. For example, it is possible to (i) form a complex from a titanium halide and an electron donor and then to contact the resulting complex with magnesium chloride, (ii) contact magnesium chloride with a titanium halide and then contact the resulting mixture with an electron donor, or (iii) contact magnesium chloride with an electron donor and then contact the resulting mixture with a titanium halide.

Alternatively, magnesium chloride is contacted with an alkoxy titanium, and then the resulting mixture can be contacted with a halogenating agent such as silicon tetrachloride, titanium tetrachloride or the like.

Such contact can be carried out by a pulverizing contact method in a ball mill, vibration mill or the like, or by adding magnesium chloride or magnesium chloride treated with an electron donor to a liquid phase containing titanium halide.

Washing with an inert solvent may be conducted after contacting the three components or in an intermediate step of the contact of each component.

The solid catalyst component thus obtained contains approximately 1 to 20% by weight of a titanium halide. The molar ratio of the electron donor to the titanium halide both contained in the solid catalyst component is approximately 0.05 to 2.0.

Component (B)

The (B) organic aluminum compound used in the present invention is preferably trialkyl aluminum. The alkyl group suitably contains approximately 1 to 8 carbon atoms. Such trialkyl aluminum compounds include, for example, trimethyl aluminum, triethyl aluminum, tri-i-butyl aluminum, and tri-n-hexylaluminum. Particularly preferred is triethyl aluminum. It is possible to use an organic aluminum compound such as an alkyl aluminum halide or an alkyl aluminum alkoxide in combination with a trialkyl aluminum.

The molar ratio of the organic aluminum compound to the titanium halide in the solid catalyst both used for polymerization is ordinarily in the range of 10 to 1,000.

Component (C)

The component (C) used in the present invention is an ether compound represented by the general formula: $R^1R^2R^3C(OR^4)$, $R^1R^2C(OC^4)_2$, or $R^1C(OR^4)_3$. In the above formulae, $R^1$ stands for an aromatic or alicyclic hydrocarbon group having approximately 5 to 15 carbon atoms, preferably 6 to 12 carbon atoms. $R^1$ is preferably an aromatic hydrocarbon having benzene ring(s) or an alicyclic hydrocarbon having a polycyclic structure. Each of $R^2$, $R^3$ and $R^4$ stands for a hydrocarbon group having approximately 1 to 10 carbon atoms, preferably approximately 1 to 7 carbon atoms. More preferably, $R^2$ and $R^3$ are an aromatic or alicyclic hydrocarbon having 1 to 10 carbon atoms or an alkyl having approximately 1 to 3 carbon atoms, and $R^4$ is an alkyl having 1 to 3 carbon atoms. Examples of such compounds are represented by the following structural formulae.

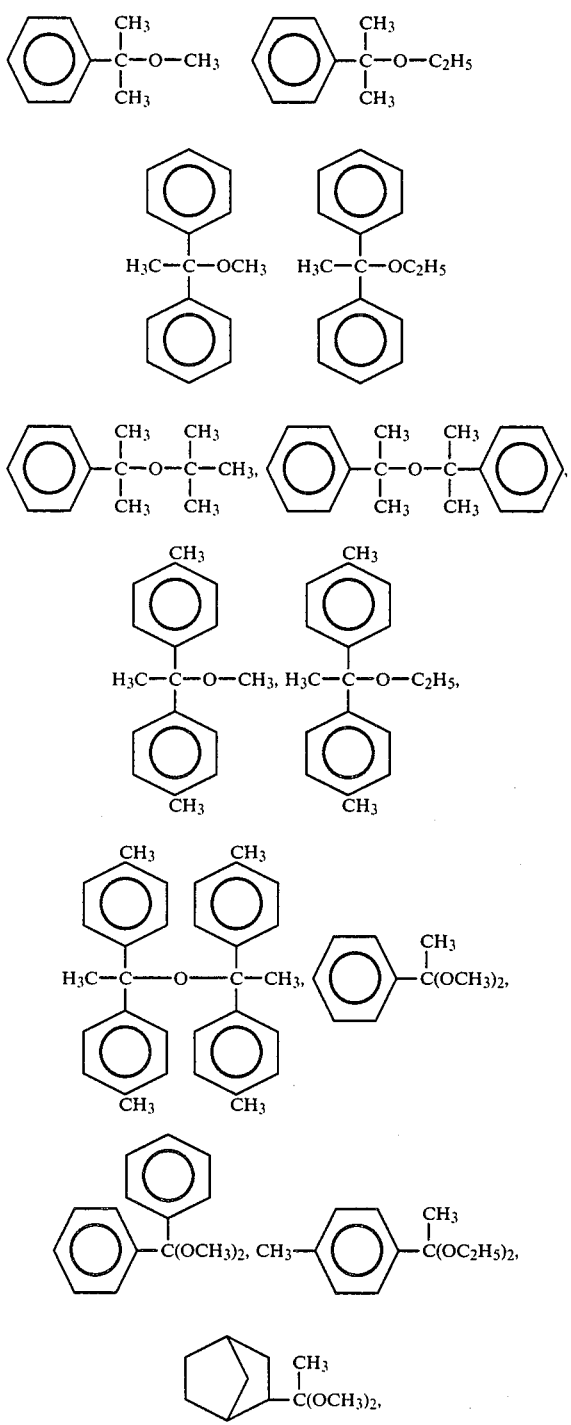

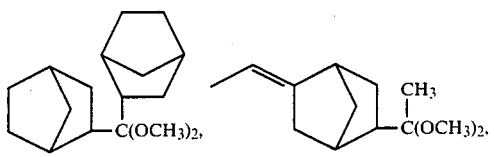
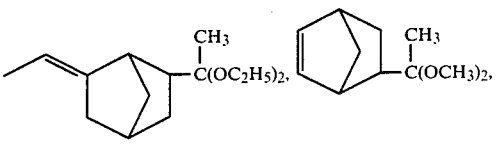
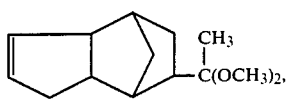
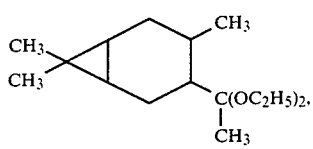
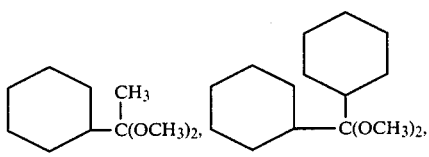
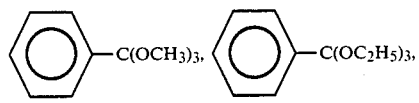
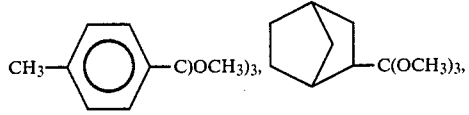
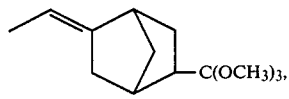
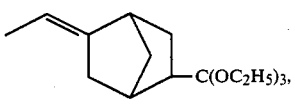
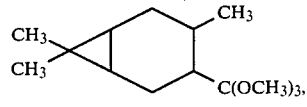
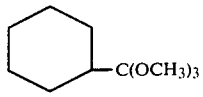

The molar ratio of the ether compound (C) to the organic aluminum compound (B) is ordinarily in the range of 0.01 to 1.0, preferably 0.02 to 0.5.

As to the ether compounds represented by the formula $R^1C(OR^4)_3$, the molar ratio is preferably in the range of 0.01 to 0.5, more preferably 0.02 to 0.2.

Polymerization of Olefins

Polymerization using a catalyst system according to the present invention is applicable to homopolymerization of each of ethylene, propylene and butene and copolymerization of two or more of these monomers.

Particularly, the catalyst is preferably used for polymerization of α-olefins having not less than 3 carbon atoms as well as for copolymerization of an α-olefin having not less than 3 carbon atoms with ethylene or with an α-olefin having not less than 4 carbon atoms.

The polymerization can be carried out either in the presence of an inert solvent or in the absence of such solvent, that is, in a gas phase or a liquid phase bulk polymerization. The polymerization can be carried out in either a continuous or batch-wise fashion. The molecular weight of the resulting polymer can be regulated by controlling the concentration of hydrogen in a polymerization vessel. The polymerization temperature is in a range of the order of 0° to 200° C., preferably of the order of 50° to 100° C. The polymerization pressure is ordinarily in the range of 1 to 100 atm.

Experimental Example

EXAMPLE 1

Preparation of solid catalyst component

A 500-ml three-necked glass flask (equipped with a thermometer and a stirrer) was purged with nitrogen gas and was charged with 75 ml of purified heptane, 75 ml of titanium tetrabutoxide, and 10 g of anhydrous magnesium chloride. Then the flask was heated to 90° C. to completely dissolve the magnesium chloride over 2 hours. The flask was then cooled to 40° C., and 15 ml of methylhydrogenpolysiloxane was added to separate out a magnesium chloride-titanium tetrabutoxide complex. After washing with purified heptane, 8.7 ml of silicon tetrachloride and 1.8 ml of diheptyl phthalate were added to the complex, which was maintained at 50° C. for 2 hours. Thereafter, the complex was washed with purified heptane, supplied with 25 ml of titanium tetrachloride, and maintained at 90° C. for 2 hours. The resulting product was washed with purified heptane to produce a solid catalyst component.

The resulting solid catalyst contained 3.0% by weight of titanium and 25.0% by weight of diheptyl phthalate.

Polymerization

A 3-liter stainless steel autoclave was purged with nitrogen and then charged with 1.5 liters of purified heptane, 0.75 g of triethyl aluminum (B), 0.15 g of diphenyl dimethoxymethane (C), and 50 mg of the solid catalyst component (A) obtained above. Hydrogen was introduced thereto in an amount corresponding to a partial pressure of 0.15 kg/cm². Then, the autoclave was heated to 70° C., and propylene was introduced thereinto and pressurized to 7 kg/cm²G to initiate polymerization. Polymerization was continued for 3 hours by supplying propylene so as to maintain this pressure.

After 3 hours, introduction of the monomer was stopped and unreacted monomer was purged therefrom to terminate the polymerization.

The resulting polymer was filtered off from the heptane and dried to produce 783.1 g of a polypropylene powder. The heptane was removed from the resulting filtrate by heating to obtain 2.3 g of amorphous polymers. The percentage of the amorphous polymer based on the total amount of the polymer (hereinafter referred to as yield of APP by-product) was 0.29%.

The content of substances insoluble in boiling n-heptane (hereinafter referred to as P-II) in the polypropylene powder was 98.7%. The polymer yield per the solid catalyst (hereinafter referred to as CY) was 15708. The MFR (melt flow index measured according to ASTM-D1238) of the polymer was 2.13 and the bulk specific gravity thereof was 0.46.

EXAMPLE 2

The solid catalyst component (A) was prepared similarly as in Example 1, and polymerization was carried out similarly as in Example 1 except that 0.12 g of 1-(2-norbornyl)-1,1-dimethoxyethane (C) was used as a polymerization additive.

As a result, 811.2 g of polypropylene powder was obtained. The yield of APP by-product was 0.35%. P-II: 97.9%, CY: 16284, MFR: 2.37, and bulk specific gravity: 0.46.

EXAMPLE 3

The solid catalyst component (A) was prepared similarly as in Example 1, and polymerization was carried out as in Example 1 except that 0.07 g of phenyltriethoxymethane (C) was used as a polymerization additive.

As a result, 583.3 g of polypropylene powder was obtained, and the yield of APP by-product was 0.31%. P-II: 97.4%, CY: 11702, MFR: 2.63, bulk specific gravity: 0.46.

EXAMPLE 4

The solid catalyst component (A) was prepared similarly as in Example 1, and polymerization was carried out as in Example 1 except that 0.19 g of 5-ethylidene-2-norbornyltriethoxymethane (C) was used as a polymerization additive.

As a result, 632.4 g of polypropylene powder was obtained, and the yield of APP by-product was 0.28%. P-II: 98.7%, CY: 12688, MFR: 2.51, bulk specific gravity: 0.47.

EXAMPLES 5 through 10

The solid catalyst component (A) was prepared similarly as in Example 1, and polymerization was carried out as in Example 1 except that the compounds in the following table were respectively used as polymerization additives. The results are shown below.

| Example No. | Additive | Quantity added (g) | CY | P-II (%) | APP (%) | MFR | Bulk specific gravity |
| --- | --- | --- | --- | --- | --- | --- | --- |
| 5 | (bicycloheptyl/norbornyl)–C(OCH$_3$)$_2$ | 0.16 | 15312 | 98.2 | 0.31 | 2.96 | 0.46 |
| 6 | (norbornenyl)–C(CH$_3$)(OCH$_3$)$_2$ | 0.12 | 16114 | 97.9 | 0.35 | 3.12 | 0.46 |
| 7 | 7,7-dimethylbicyclo[4.1.0]heptyl–C(CH$_3$)(OC$_2$H$_5$)$_2$ | 0.19 | 13212 | 97.1 | 0.91 | 3.51 | 0.45 |
| 8 | cyclohexyl–C(CH$_3$)(OCH$_3$)$_2$ | 0.11 | 16919 | 96.3 | 1.26 | 4.63 | 0.44 |
| 9 | CH$_3$–C$_6$H$_4$–C(OC$_2$H$_5$)$_3$ | 0.07 | 10691 | 97.1 | 0.35 | 2.34 | 0.46 |
| 10 | indanyl–C(OC$_2$H$_5$)$_3$ | 0.07 | 9830 | 98.0 | 0.31 | 2.03 | 0.47 |

EXAMPLE 11

Preparation of solid catalyst component

A 500-ml three-necked glass flask (equipped with a thermometer and a stirrer) was purged with nitrogen gas and charged with 75 ml of purified heptane, 75 ml of titanium tetrabutoxide, and 10 g of anhydrous magnesium chloride. Then the flask was heated to 90° C. to completely dissolve the magnesium chloride over 2 hours. The flask was then cooled to 40° C., and 15 ml of methylhydrogenpolysiloxane was added to separate out magnesium chloride-titanium tetrabutoxide complex. After washing with purified heptane, 8.7 ml of silicon tetrachloride and 1.5 ml of phthaloyl chloride were added to the complex, which was maintained at 50° C. for 2 hours. Thereafter, the complex was washed with purified heptane, supplied with 25 ml of titanium tetrachloride, and maintained at 30° C. for 2 hours. The resulting product was washed with purified heptane to produce a solid catalyst component.

The resulting solid catalyst contained 3.3% by weight of titanium. The specific surface area of the solid catalyst component was 1.2 m$^2$/g.

Polymerization

Polymerization was carried out as in Example 1. As a result, 811.2 g of polypropylene powder was obtained, and the yield of APP by-product was 0.31%, P-II: 98.5%, CY: 16273, MFR:1.93, bulk specific gravity: 0.46.

EXAMPLE 12

Preparation of solid catalyst component

A 500-ml three-necked glass flask (equipped with a thermometer and a stirrer) was purged with nitrogen gas and charged with 75 ml of purified heptane, 75 ml of titanium tetrabutoxide and 10 g of anhydrous magnesium chloride. Then the flask was heated to 90° C. to completely dissolve the magnesium chloride over 2 hours. The flask was then cooled to 40° C., and 15 ml of methylhydrogen polysiloxane was added thereto to separate out the magnesium chloride-titanium tetrabutoxide complex. After washing with purified heptane, the complex was supplied with 8.7 ml of silicon tetrachloride and 1.8 ml of diheptyl phthalate, and maintained at 50° C. for 2 hours. Thereafter, the complex was washed with purified heptane, supplied with 25 ml of titanium tetrachloride and maintained at 90° C. for 2 hours. The resulting product was washed with purified heptane to obtain a solid catalyst component.

The resulting solid catalyst contained 3.0% by weight of titanium and 25.0% by weight of diheptyl phtha- late.

Polymerization

A 3-liter stainless steel autoclave was purged with nitrogen and then charged with 1.5 liters of purified heptane, 0.75 g of triethyl aluminum (B), 0.10 g of α-cumyl methyl ether (C), and 50 mg of the solid catalyst component (A) obtained as described above. Hydrogen was introduced thereinto in an amount corresponding to a partial pressure of 0.15 kg/cm$^2$. Then the autoclave was heated to 70° C., and propylene was introduced thereinto and pressurized to 7 kg/cm$^2$G to initiate polymerization. Polymerization was continued for 3 hours with supplying of propylene so as to maintain this pressure.

After 3 hours, introduction of the monomer was stopped, and unreacted monomer was purged therefrom to terminate polymerization.

The resulting polymer was filtered off from the heptane and dried to obtain 764.5 g of polypropylene powder. The heptane was removed from the resulting filtrate by heating to obtain 4.1 g of amorphous polymer. The yield of APP by-product in the whole polymer was 0.53%.

The P-II of this polypropylene powder was 97.1%. The yield of the polymer per the solid catalyst was 15372. MFR was 1.94 and bulk specific gravity was 0.46.

EXAMPLE 13

Solid catalyst ccmponent (A) was prepared similarly as in Example 12, and polymerization was carried out as in Example 12 except that 0.11 g of α-cumyl ethyl ether (C) was used as a polymerization additive.

As a result, 748.1 g of polypropylene powder was obtained, and the yield of APP by-product was 0.69%. P-II: 96.4%, CY: 15067, MFR: 2.11, bulk specific gravity: 0.46.

EXAMPLE 14

Solid catalyst component (A) was prepared similarly as in Example 12, and polymerization was carried out as in Example 12 except that 0.16 g of 1,1-diphenylethyl methyl ether (C) was used as a polymerization additive.

As a result, 788.3 g of polypropylene powder was obtained, and the yield of APP by-product was 0.32%. P-II: 98.6%, CY: 15817, MFR: 1.87, bulk specific gravity: 0.47.

EXAMPLE 15

Preparation of solid catalyst component

A 500-ml three-necked glass flask (equipped with a thermometer and a stirrer) was purged with nitrogen gas and charged with 75 ml of purified heptane, 75 ml of titanium tetrabutoxide and 10 g of anhydrous magnesium chloride. Then the flask was heated to 90° C. to completely dissolve the magnesium chloride over 2 hours. The flask was then cooled to 40° C., and 15 ml of methylhydrogenpolysiloxane was added thereto to separate out a magnesium chloride-titanium tetrabutoxide complex. After washing with purified heptane, the complex was supplied with 8.7 ml of silicon tetrachloride and 1.5 ml of phthaloyl chloride and maintained at 50° C. for 2 hours. Thereafter, the complex was washed with purified heptane, supplied with 25 ml of titanium tetrachloride, and maintained at 30° C. for 2 hours. The resulting product was washed with purified heptane to produce a solid catalyst component.

The resulting solid catalyst contained 3.3% by weight of titanium. The specific surface area of the solid catalyst component was 1.2 m$^2$/g.

Polymerization

Polymerization was carried out as in Example 12. As a result, 793.1 g of polypropylene powder was obtained. The yield of APP by-product was 0.59%. P-II: 96.7%, CY: 15956, MFR: 2.02, bulk specific gravity: 0.46.

What is claimed is:

1. A process for producing propylene polymers which comprises contacting propylene with a catalyst thereby to polymerize the propylene, said catalyst comprising:

(A) a solid catalyst component comprising as essential components a substantially anhydrous magnesium halide, titanium tetrachloride or titanium trichloride and an ester or an acid halide as electron donor,
(B) a trialkylaluminum compound, and
(C) an ether compound represented by the formula: $R^1R^2R^3C(OR^4)$ or $R^1R^2C(OR^4)_2$ wherein, $R^1$ stands for an aromatic or alicyclic hydrocarbon group having 6 to 12 carbon atoms, and each of $R^2$, $R^3$ and $R^4$ stands for a hydrocarbon group having 1 to 7 carbon atoms, and the molar ratio of the ether compound added to the organoaluminum compound (B) being in the range of 0.02 to 0.5, and the molar ratio of the electron donor to the titanium tetrachloride or titanium trichloride is approximately 0.05 to 2.0.

2. The process as in claim 1 wherein the molar ratio of the trialkylaluminum compound (B) to the titanium tetrachloride or titanium trichloride in the solid catalyst compound (A) is in the range of 10 to 1,000, the polymerization temperature is in the range of 50° to 100° C., and the polymerization pressure is in the range of 1 to 100 atm.

* * * * *